United States Patent

Carranza

[11] Patent Number: 5,906,361
[45] Date of Patent: May 25, 1999

[54] CONICAL DISC SPRING COLUMN

[76] Inventor: Luis Muller Carranza, Carretera Nacional II, Km 774 5, La Jonquera (Girona), Spain, 17700

[21] Appl. No.: 09/114,873

[22] Filed: Jul. 14, 1998

[30] Foreign Application Priority Data

Jul. 15, 1997 [ES] Spain ................................. 9701649

[51] Int. Cl.[6] .............................. F16F 1/20; B60G 11/14
[52] U.S. Cl. ......................................... 267/162; 267/291
[58] Field of Search ................................... 267/161, 162, 267/164, 170, 179, 288, 291, 287

[56] References Cited

U.S. PATENT DOCUMENTS 2,387,266  10/1945  Holland .................................. 267/162

FOREIGN PATENT DOCUMENTS

| 612779 | 1/1961 | Canada | 267/162 |
| 1019918 | 11/1957 | Germany | 267/162 |
| 2751992 | 5/1979 | Germany | 267/162 |

*Primary Examiner*—Chris Schwartz
*Attorney, Agent, or Firm*—Dennison, Meserole, Scheiner & Schultz

[57] ABSTRACT

The conical disc spring column has a central shaft with retention shields at both ends thereof and with aligned superposed conical discs positioned about the shaft, the shaft being formed of two coaxial telescopic sections having a sliding connection therebetween for controlled retraction and extension of the shaft.

4 Claims, 4 Drawing Sheets

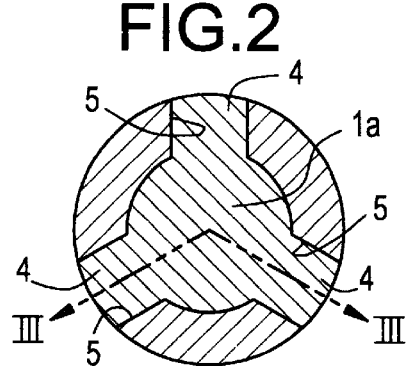
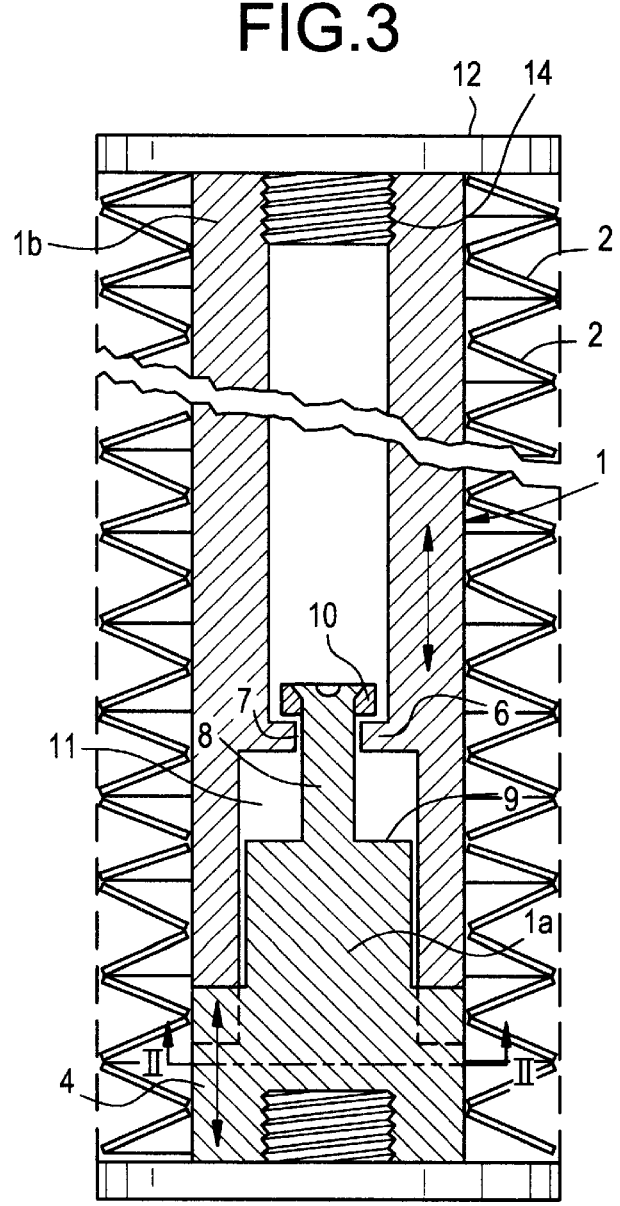

CONICAL DISC SPRING COLUMN

BACKGROUND OF THE INVENTION

The present invention is broadly concerned with conical disc spring columns.

To operate properly, certain machines require conical disc spring columns rather than disc-shaped steel wire springs.

The use of conical disc springs is limited by the fact that they must be guided by an external tubular cylinder, or have an inserted cylindrical shaft to hold them mutually juxtaposed in columnar form; such guides being required for their use.

The guides are provided at their ends with a number of disc-shaped shields that serve as stops of the ends of the conical disc spring column while keeping the ends from escaping the guide.

For a specific machine to use a disc spring column, it must possess an appropriate mechanical system with a component which presses on the conical disc springs and causes them to compress.

In known disc spring columns, when the guide is in the form of a single-piece central shaft, and the height of the spring column is to be reduced when subjected to sufficient perpendicular pressure for that purpose, the inserted rigid single-piece shaft does not collapse, rather, a central opening must be allowed for the emergence of the upper end of said single-piece rigid central shaft.

However, in connection with the vertical or longitudinal emergence of the rigid single-piece central shaft, the presence of the projecting portion disturbs and obstructs the proper operation of the conical disc spring column, thus limiting its use.

It has been proposed that the compression support piece which receives the compressing force having a housing with sufficient clearance so that the protruding guide is not exposed and so that it is protected by the housing chamber having appropriate clearance provided for such time as when the guide is in the projected position.

The housing chamber must occupy an amount of space that varies depending on the height of the path created on the compression of the column of conical discs that form it, and must take into account the vertical emergence of the inserted rod.

The trapped volume, which must be present, adversely affects the installation and proper operation of the spring and the machine in which it is installed.

SUMMARY OF THE INVENTION

It is a principal object of the invention to eliminate the external emergence of the inserted rod of the superposed conical springs, to eliminate the volume of the piece that defines the compression housing and support chamber, to eliminate the housing portion of the protruding guide, and to increase the efficiency of the spring column, expanding its use to new industrial sectors.

This, and related objects are achieved by creating a retractable guide, the height of which adapts at any time to the varying height of the conical disc spring column when it is subjected to the variable load of the perpendicular pressurizing device, which, at the appropriate time, presses against the shield at the upper end of the conical disc spring column. Thus there is no need for the protection and housing chamber.

The retractable guide not only eliminates the problem of one of its ends protruding through one end of the column, it also makes it possible to fix support points whose downward compression angle is different from the axial line of the column, as shown schematically in FIGS. 4 and 5, in which the compression element is a lever in FIG. 4, and in FIG. 5 is a ball joint for an oscillating machine.

A more detailed description of one embodiment, provided as a nonrestrictive example, of a conical disc spring column according to the invention, is set forth below.

BRIEF DESCRIPTION OF THE DRAWINGS

FIG. 2 is a transverse cross-section through the shaft and taken on line II—II in FIG. 3;

FIG. 3 is a longitudinal sectional view taken substantially on line III—III in FIG. 2 with the discs mounted;

FIG. 6 is a schematic representation of the oscillating movement lines transmitted to an inserted shaft of the conical spring column, assembled for oscillating machines or the like.

DESCRIPTION OF PREFERRED EMBODIMENT

Figure 1:
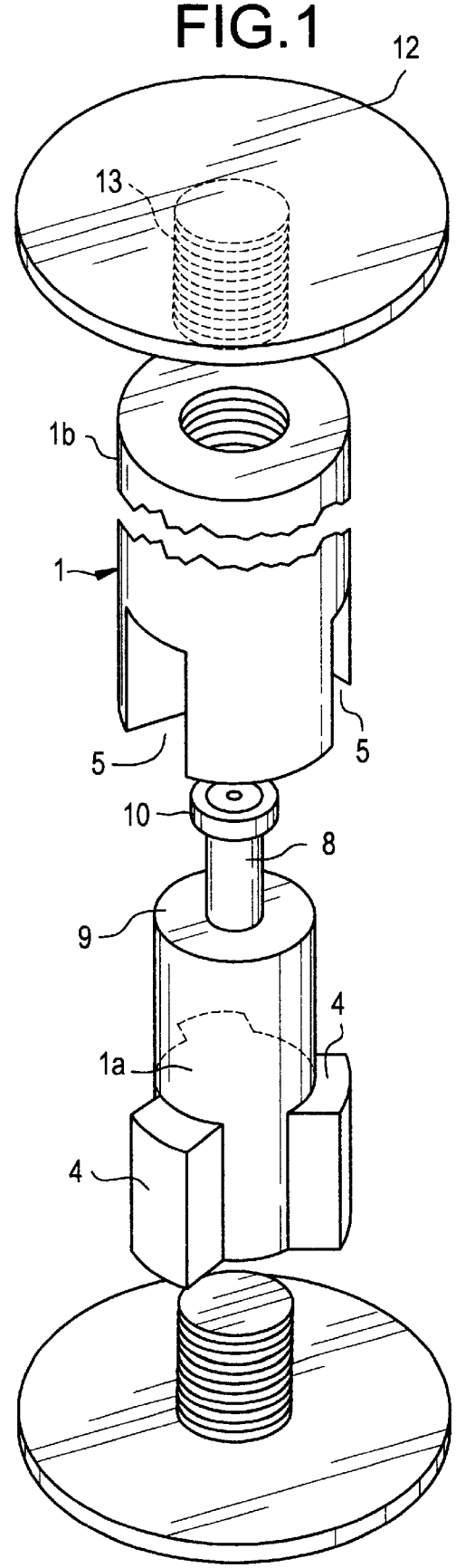
FIG. 1 is an exploded and partially foreshortened view of the conical disc spring column according to the invention, and without representing the conical discs or the pressurizing element engaging the upper stop shield of the spring column.
Figure 4:
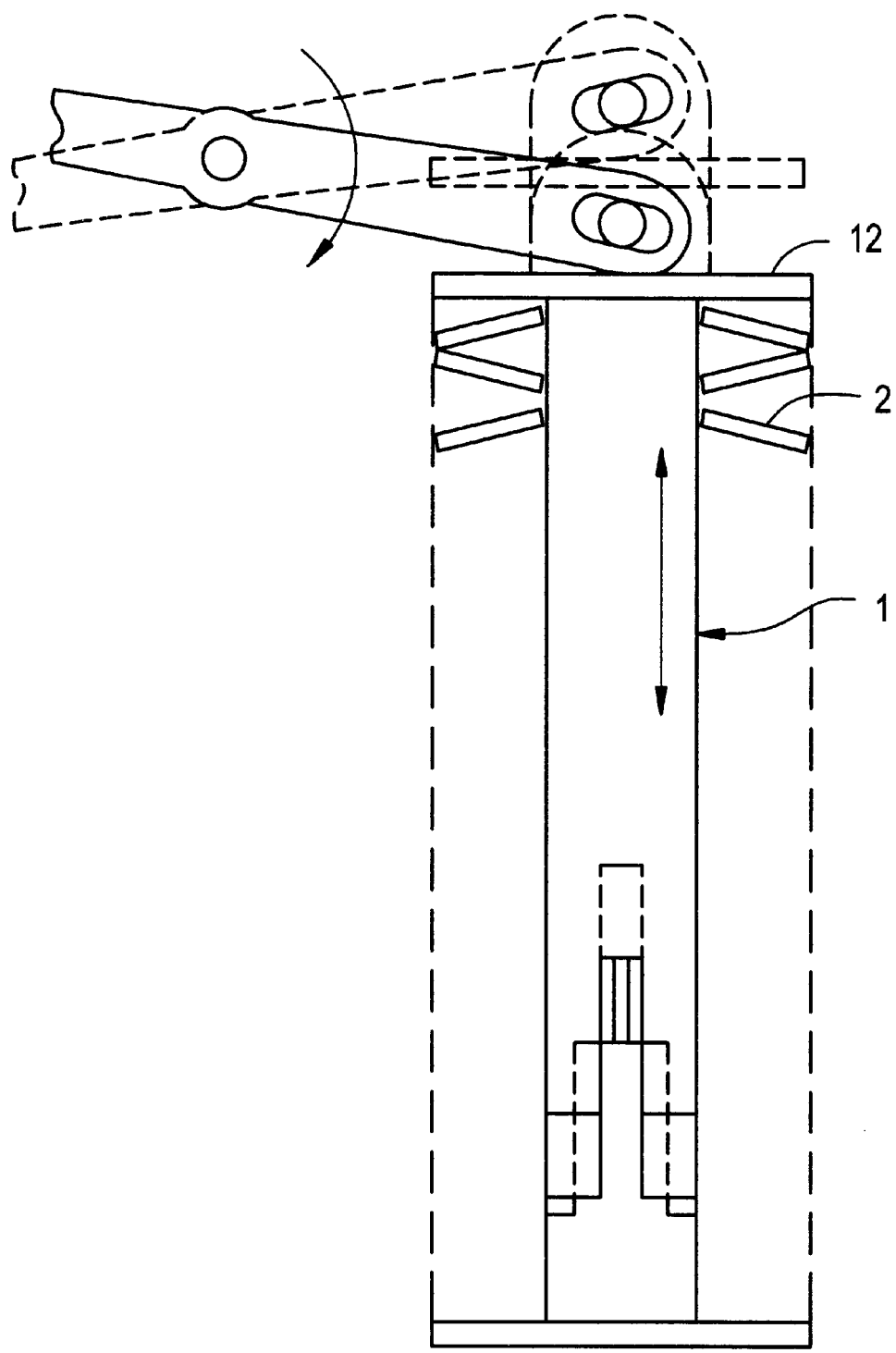
FIG. 4 is a schematic representation of part of a pressurizing device with a lever pressing against the external surface of the upper horizontal shield covering the conical discs forming the spring column.
Figure 5:
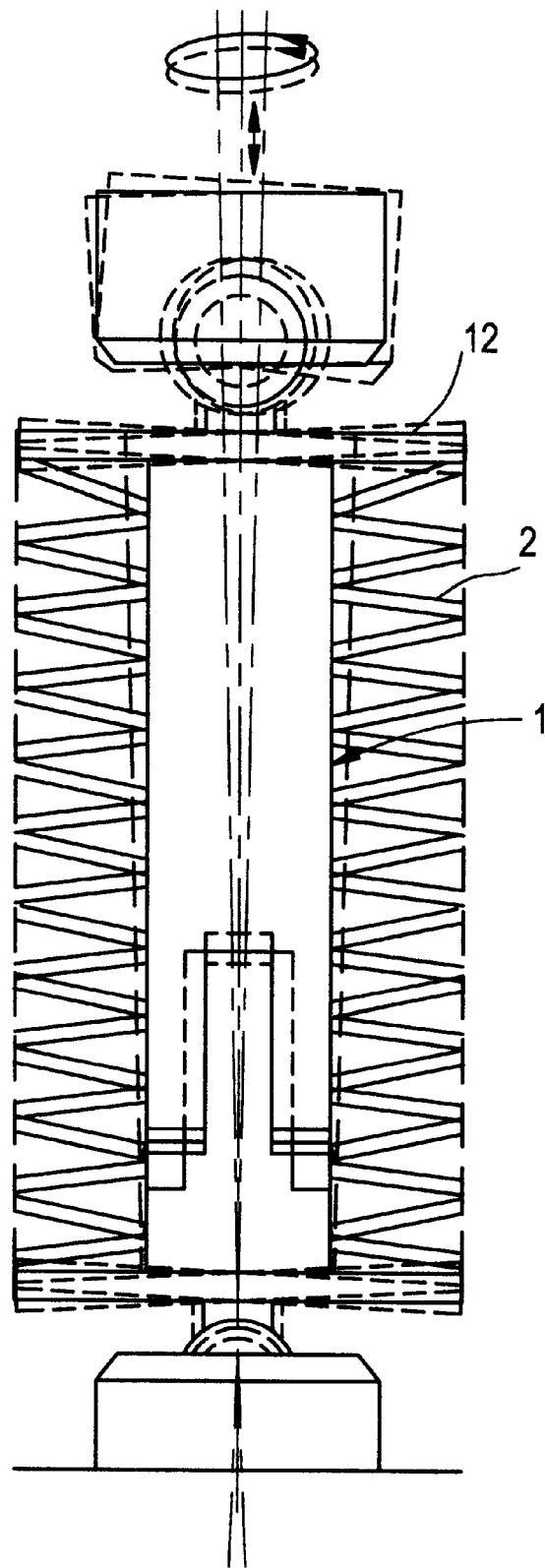
FIG. 5 schematically illustrates a conical disc spring column with the compression shaft according to the invention, showing a variation wherein a ball joint applies the load against the moving upper shield, as in oscillating machines.
Figure 6:
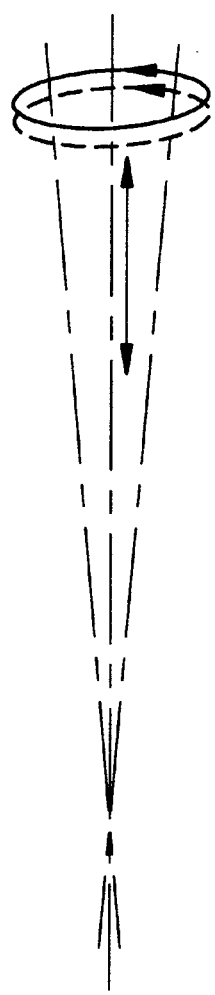

The invention comprises a central shaft 1 which is inserted through all conical discs 2 that form the compression spring. The shaft 1 is composed of two telescopically-joined coaxial sections 1a and 1b, wherein the lower internal section 1a has, joined to its periphery and around its base, three protruding blocks forming mutually equidistant radial arms 4.

The upper external section 1b of compression shaft 1 is cylindrical with the lower exposed base portion having three exposed inverted U-shaped notches 5 opening through the lower edge. The notches 5 are of a predetermined depth and whose width exceeds the thickness of the three radial arms 4 of lower section 1a.

The depth of notches 5 on the edge of the lower base portion of external section 1b of compression shaft 1 is optimal to obtain the desired effects when the two sections 1a and 1b are telescopically interconnected.

The internal diameter of the internal central chamber of upper cylindrical section 1b is restricted by a transverse baffle 6 having a central opening 7 into which a reduced diameter coaxial extension 8, which originates from the central part of internal horizontal platform 9 of lower section 1a of compression shaft 1, is slidably inserted.

When the two sections 1a and 1b of compression shaft 1 are coaxially coupled slidingly together, protruding coaxial extension 8 passes vertically through internal central opening 7 in section 1b of shaft 1. To the top of extension 8 is attached an annular flange 10 that is larger than the diameter of internal opening 7, the flange acting as a stop and enabling extension 8 to slide axially, to a certain limit, in either direction, through the opening 7. Annular flange 10 prevents protruding coaxial extension 8 from escaping inopportunely from its sliding insertion, thus maintaining the connection between the two sections 1a and 1b of compression shaft 1.

When the spring column is at rest, an intermediary space 11 provides the appropriate separation, depending on the features which the conical spring column is constructively required to have. This space is provided between platform 9 of internal section 1a of compression shaft 1 and the lower surface of internal transverse baffle 6 of external section 1b.

The purpose of space 11 is to enable section 1a to slide coaxially with respect to section 1b of compression shaft 1.

When section 1b of compression shaft 1 moves coaxially in the downward direction, as the result of vertical pressure applied to the shield of the upper end of spring column 2, central baffle 6 of external section 1b comes to press on platform 9, the latter being one of the stops that limits the downward path of external section 1b with relation to internal section 1a.

The U-shaped notches 5 in external section 1b of compression shaft 1, when both sections 1a and 1b are mutually connected, with axial sliding capability, are inverted to open downwardly toward section 1a.

During the coaxial sliding of one section 1b with relation to the other section 1a or shaft 1, U-shaped notches 5 slide along blocks 4 of section 1a, until the bottom of each inverted U in turn presses against the upper platform of each block 4, thus causing these platforms also to serve as stops to limit the path of external section 1b with relation to internal section 1a.

This arrangement prevents the inserted coaxial shaft of the conical springs from protruding outside the spring column, since the compression shaft retracts as the spring column lowers, and gradually regains it height strictly from the impulse of the conical springs that form the column, through the inserted shaft, which pull on external upper section 1b through pressure against upper shield 12 connected to external upper section 1b by a threaded stub shaft 13 thereon threaded into the mouth of the axial opening at the upper end of the central chamber of upper section 1b. The helical threading 14 on stub shaft 13 also allows use of shield 12 as a tension regulator for conical spring column. A similar lower shield is mounted to the lower end of the lower section 1a, also by a threaded stub shaft.

As described, the compression shaft does not protrude at its upper end, even when pressure exists on the upper end of the spring disc column, as it yields in compression or expansion, as does the conical disc spring column.

Many embodiment details can be varied without altering, changing, or modifying the essence of the invention, and the invention is not to be limited solely to the embodiment specifically illustrated herein.

I claim:

1. A conical disc spring column having a central shaft with opposed ends, retention shields mounted at both said opposed ends of said shaft, and conical discs mounted in a column about said shaft and between said shields, said conical disks forming a spring, wherein said shaft comprises a compression shaft composed of two coaxial, telescopic sections, said sections being slidably joined for axial adjustment relative to each other while precluding relative rotation and inadvertent separation, said sections comprising a lower section and an external upper section forming a tubular cylinder for movement axially upward and downward over a predetermined maximum length along the lower section, said lower section mounting a first one of said shields which serves as a lower stop for the conical discs forming the spring, wherein the lower section of the compression shaft comprises a circular column, the upper end of said column forming a circular flat platform from the center of which a coaxial extension of predetermined height extends, said circular column including a lower base portion with radially outwardly extending projections thereon and spaced thereabout.

2. The conical disc spring column according to claim 1, wherein the upper section of the compression shaft includes exposed downwardly opening notches positioned to coincide with the projections on said circular column of the lower section of the compression shaft.

3. The conical disc spring column according to claim 2, wherein the external upper section includes an internal baffle limiting axial movement of the upper section downward over the lower section, said baffle having a central opening aligned with and slidably receiving said extension, and a space defined between the baffle and platform of the lower section, prior to axial adjustment of said sections, which allows for and defines the limit of movement of said external upper section with relation to the coaxial lower section.

4. The conical disc spring column according to claim 3 including a stop attached to the top of said extension beyond said baffle, said stop being larger than said opening in the baffle through which said extension slides, said stop forming a limit for movement of the external upper section and as a retaining element for both sections as one section telescopically slides with relation to the other section.

* * * * *